United States Patent [19]

Congdon

[11] Patent Number: 4,777,627

[45] **Date of Patent: * Oct. 11, 1988**

[54] EXTENDIBLE SONOBUOY APPARATUS

[75] Inventor: John C. Congdon, Fort Wayne, Ind.

[73] Assignee: Magnavox Government and Industrial Electronics Company, Fort Wayne, Ind.

[ * ] Notice: The portion of the term of this patent subsequent to Aug. 22, 2004 has been disclaimed.

[21] Appl. No.: 38,303

[22] Filed: Apr. 14, 1987

Related U.S. Application Data

[63] Continuation of Ser. No. 748,751, Jun. 26, 1985, Pat. No. 4,689,773, which is a continuation-in-part of Ser. No. 446,330, Dec. 2, 1982, Pat. No. 4,546,459.

[51] Int. Cl.[4] .............................................. H04B 1/59

[52] U.S. Cl. .............................................. 367/3; 367/4; 367/159; 367/173; 441/1

[58] Field of Search .............................................. 367/2-6, 367/151-155, 157, 159, 164-166, 169-171, 173, 178; 114/326, 339, 340; 441/1, 32

[56] References Cited

U.S. PATENT DOCUMENTS

| | | | |
|---|---|---|---|
| 3,444,508 | 5/1969 | Granfors | 367/3 |
| 4,247,143 | 1/1981 | Putman | 367/4 |
| 4,546,459 | 10/1985 | Congdon | 367/155 |
| 4,689,773 | 8/1987 | Congdon et al. | 367/3 |

*Primary Examiner*—Thomas H. Tarcza
*Assistant Examiner*—Daniel T. Pihulic
*Attorney, Agent, or Firm*—Thomas A. Briody; William J. Streeter; Richard T. Seeger

[57] ABSTRACT

A sonobuoy has several components slidably mounted in an elongated tube. The components are longitudinally stacked one above the other at the lower end of the tube when the sonobuoy is in a pre-deployed state and are caused to slide longitudinally upwardly in the tube during sonobuoy deployment to provide a predetermined longitudinal spacing between the components when the sonobuoy is deployed. The components typically include an electronics canister, acoustic wave phase controls and one or more active electroacoustic transducers. The components are attached to a plurality of flexible support cables. The cables are attached at their respective upper ends to the bottom of the canister and are attached at their respective lower ends to the bottom of the tube. The cables are collapsed during the pre-deployed state and tautly extended during the deployed state. Axial guide strips are affixed to the inner surface of the tube. The canister and transducer have recesses engaging the strips in a sliding fit to prevent rotation about the tube longitudinal axis during deployment. The electroacoustic transducer may be mounted to the tube at a predetermined axial location on the tube.

18 Claims, 6 Drawing Sheets

EXTENDIBLE SONOBUOY APPARATUS

RELATED APPLICATION

This is a continuation of copending application Ser. No. 06/748,751 filed by John C. Congdon, Thomas A. Richter, and Joseph J. Slachta on June 26, 1985 and entitled "Extendible Sonobuoy Apparatus" now U.S. Pat. No. 4,689,773 which is a continuation in part of then copending application Ser. No. 06/446,330, filed by John C. Congdon on Dec. 2, 1982 and entitled "Method and Apparatus for a Phased Array Transducer", now U. S. Pat. No. 4,546,459 issued Oct. 8, 1985.

BACKGROUND OF THE INVENTION

1. Field of the Invention

This invention is in the field of sonobuoys and more particularly to sonobuoy deployment apparatus.

2. Description of the Prior Art

Sonobuoys typically are dropped from an aircraft by parachute or are submerged from a surface vehicle into the ocean. The parachute is then expelled, an antenna and upper electronics canister are floated to the water surface, an outer casing is dropped away to the ocean floor, an electronics canister, phase control means and electroacoustic transducer array components in their pre-deployed state be compact in size for purposes of storage, transportation, protection of the components and ease of handling. At the same time, in the deployed state, it is desired in certain instances to have a pedetermined longitudinal spacing between the components resulting in a longitudinally extended deployed dimension. This invention provides both objectives: a compact pre-deployed state and an extended deployed state of the components.

SUMMARY OF THE INVENTION

A sonobuoy in its pre-deployed state is provided with an outer casing in which is retained a parachute, an antenna mounted float, and an elongated cylindrical tubular outer member. An electroacoustic transducer and acoustic wave phase controls are compactly placed in the lower end of the outer member next to a nose weight affixed to the bottom of the outer member. A cylindrical electronics canister inner member is telescopically received by the outer member and is slid downwardly until it is contiguous with the components in the lower end of the outer member. A release mechanism such as that disclosed in common assignee copending application Ser. No. 555,978 filed Nov. 29, 1983 by Robert L. Barker and entitled "Sonobuoy Retaining and Release Apparatus", now U.S. Pat. No. 4,654,832 issued Mar. 31, 1987. incorporated herein by reference, typically is activated after immersion in the water and releases the parachute and antenna mounted float from the outer casing after which the outer casing falls away from the outer member to the ocean bottom. After the release, the nose weight in the outer member acts as a stabilizer and an anchor and aids in sliding the outer member downwardly along the canister. The upper end of each of a plurality of flexible cables is attached to a bulkhead which is affixed to the bottom of the canister. The cable upper ends are attached to the bulkhead at arcuately equidistantly spaced points. The lower end of each of the cables is attached at corresponding arcuately equidistantly spaced points to the nose weight. The cables are attached at predetemined longitudinally spaced points to each of components in the outer member and as the canister and outer member telescopically separate the cables become taut and the components become positioned at predetermined longitudinally spaced locations along the outer member.

Guide strips are longitudinally affixed to the inner surface of the outer member at arcuately equidistantly spaced points about its periphery. Radially outwardly facing recesses are formed in the bulkhead of the canister and in the transducer. Each recess receives a corresponding strip in a sliding fit to maintain rotative alignment between the canister, transducer and outer member as the components become deployed.

It is therefore an object of this invention to provide a sonobuoy that is extendible between pre-deployed and deployed states.

Another object is to provide a sonobuoy that prior to deployment has the sonobuoy elements compacted in an elongated outer tube and has an electronics canister telescopically received in the outer tube and in a deployed state has the canister telescopically extended from the outer tube and the components longitudinally spaced apart in the outer tube at predetermined distances.

The above mentioned and other features and objects of this invention and the manner of obtaining them will become more apparent and the invention itself will be best understood by reference to the following description of an embodiment of the invention taken in conjunction with the accompanying drawings.

DESCRIPTION OF PREFERRED EMBODIMENTS

Figure 1:
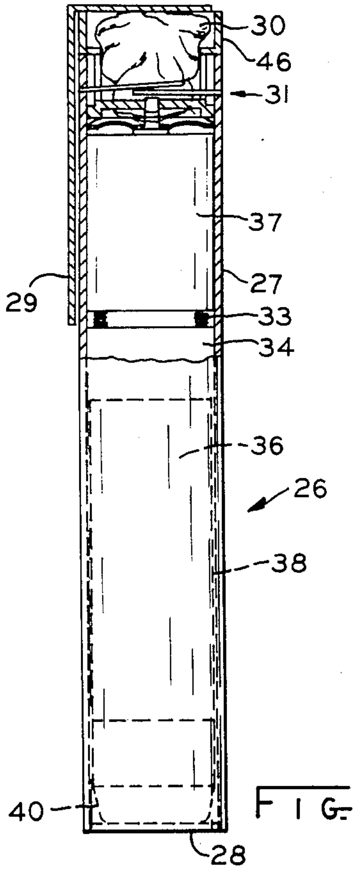
FIG. 1 is a partially sectioned side elevational view of a sonobuoy of this invention.
Figure 2:
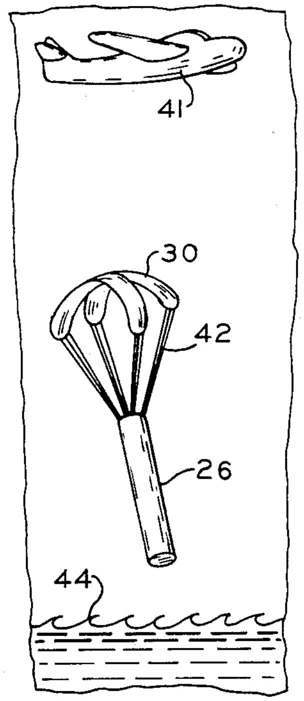
FIG. 2 is a perspective view of a sonobuoy of FIG. 1 with the parachute open and about to enter the water after being dropped from an aircraft.
Figure 3:
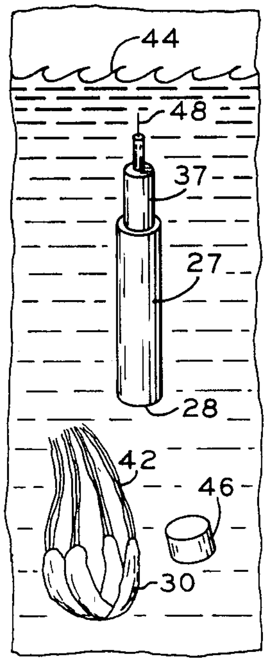
FIG. 3 is a view in perspective of the sonobuoy of FIG. 2 after it has entered the water and the parachute has been ejected.
Figure 4:
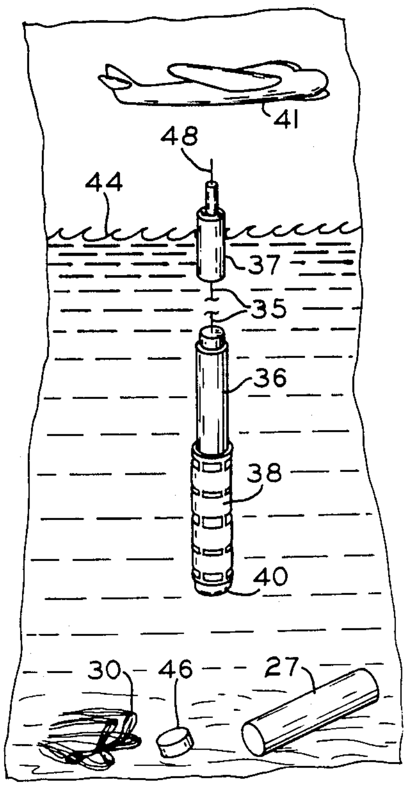
FIG. 4 is a view in perspective of the sonobuoy of FIG. 3 fully deployed and with the outer case separated.

Referring to FIGS. 1-4 a sonobuoy 26 prior to deployment has cylindrically tubular outer casing 27 having lower end 28, wind blade 29 at the outside upper end thereof and inside thereof in descending order parachute 30, parachute release mechanism shown generally at 31, cylindrical rigid float canister 37, spring 33, cable pack 34, lower electronic components canister 36 and a cylindrical electroacoustic transducer, such as an hydrophone, elongated container 38 having a longitudinal axis and a nose weight 40. Sonobuoy 26 is dropped or launched from aircraft 41 and blade 29 is wind actuated in conventional manner to deploy parachute 30, and a plurality of shroud lines 42 are releasably attached inside casing 27 to provide a controlled descent to the surface of water 44.

After casing 27 enters water 44 parachute 30, parachute shroud lines 42, and parachute cup 46 attached to the lower ends of lines 42 are ejected as in the previously referenced Barker application and the buoyancy force of float canister 37, and optionally the force of spring 33, causes separation of canister 37 from casing 27. Antenna 48 is automatically extended from canister 37 and extends above the surface of water 44 for transmission and/or reception of signals in an active or passive sonobuoy as is known in the art. Other retaining and release mechanisms for sonobuoys may be used with the invention as herein disclosed.

Canister 37 is connected to the upper end of cable 35 which pays out of cable pack 34. It is understood that cable 35 could pay out of a surface pack or other cable supply. The lower end of cable 35 is connected to the top of lower canister 36. In the deployed condition shown in FIG. 4, casing 27 is free of its previous contents and sinks to the bottom which is facilitated by release of end 28. Alternatively, end 28 may be perforated to facilitate the sinking of casing 27. Alternatively, an inflatable balloon may be used in place of canister 37, the balloon being inflated after the submergence of sonobuoy 26.

Shroud lines 42 must securely support casing 27 to parachute 30 in its descent to the surface of water 44 and then must be reliably and forcefully ejected clear of casing 27 to provide subsequent unrestricted emergence from casing 27 of the remaining sonobuoy components. Parachute 30, shroud retaining cup 46 and upper canister 37 are ejected. Prior to such ejection, the sonobuoy components are retained in outer casing 27. The mechanism for accomplishing this is described in the previously referenced Barker application.

After ejection lower canister 36 is telescopically extended from container 38 and the hydrophone components in container 38 are erected as will next be described.

Figure 5:
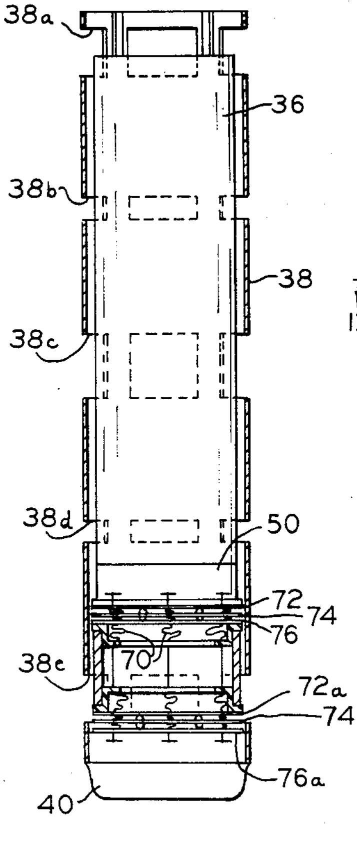
FIG. 5 is a vertical section of a sonobuoy of this invention in a pre-deployed state after ejection of the parachute and the upper electronics canister.
Figure 6:
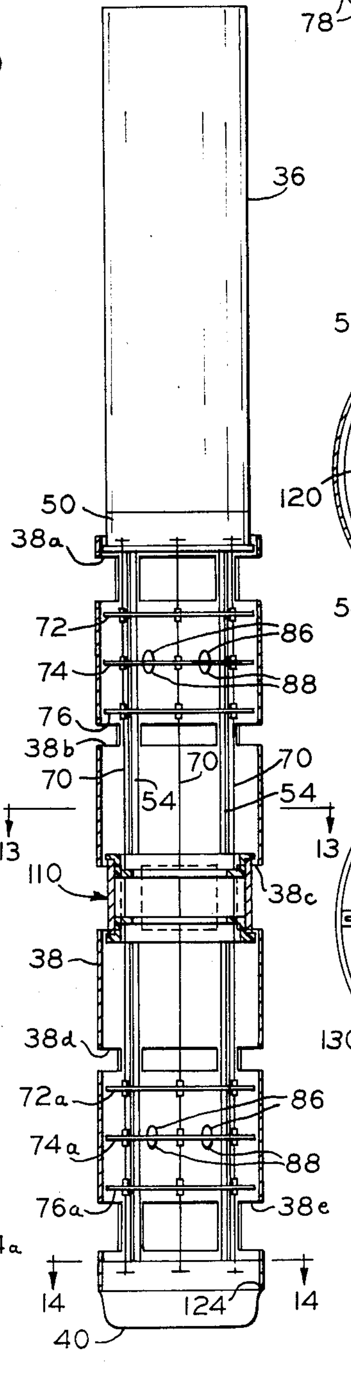
FIG. 6 is a vertical section similar to the view in FIG. 5 of a sonobuoy of this invention in a fully deployed state.
Figure 8:
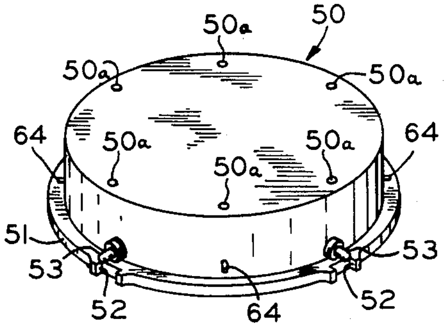
FIG. 8 is a perspective view of a bulkhead that is for attachment to the lower end of the lower canister as shown in FIGS. 5 and 6.

Referring to FIG. 5, the pre-deployed sonobuoy components are shown and transducer array container 38 is telescopically and slidingly received in lower canister 36. Referring to FIGS. 5, 6 and 8, solid cylindrical bulkhead 50 is fitted into and attached, as by screws, not shown, in tapped holes 50*a*, in the lower end of canister 36. Flange 51 is formed at the lower end of bulkhead 50 and has four equidistantly arcuately spaced radially outwardly facing oblong notches 52 about the periphery of bulkhead 50. A radially outwardly spring urged pin 53 is mounted in bulkhead 50 immediately above the arcuate center of each notch 52. Each pin 53 extends radially outwardly slightly beyond the outermost radial extent of its respective notch 52, FIG. 11, and can be depressed radially inwardly to the innermost radial extent of its respective notch 52, FIG. 10.

Affixed, as by riveting, to the inner wall of container 38 are four longitudinally aligned longitudinal strips 54 which are equidistantly arcuately spaced about the periphery of container 38 so as to register arcuately with respective notches 52. Strips 54 each extend from the top of container 38 to a point slightly above the lower end of container 38. The lower end of each strip 54 is chamfered for reasons that will become apparent. Strips 54 may be of a nylon or other long wearing bearing type material. Notches 52 have a sliding fit with respective strips 54 as bulkhead 50 slides longitudinally in container 38.

Figure 11:
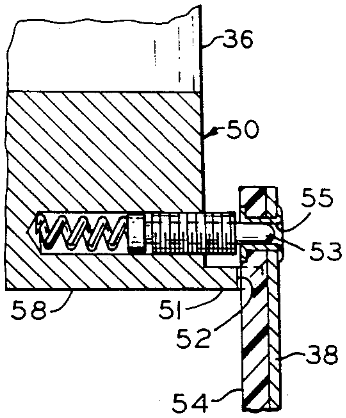
FIG. 11 is a view similar to FIG. 10 of the bulkhead in the fully deployed state of the sonobuoy.
Figure 10:
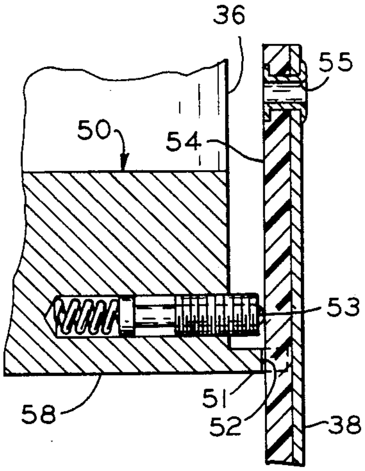
FIG. 10 is an enlarged sectioned partial view of the bulkhead of FIG. 8 in an intermediate position relative the container in the deployment of the sonobuoy.

Referring to FIGS. 10 and 11, near the top of each strip 54 is a metal eyelet 55 that is dimensioned to receive a respective pin 53 when bulkhead 50 is slid to its uppermost position in container 38 to lock bulkhead 50 in that position. Pins 53 ride on respective strips 54 as bulkhead 50 is slid upwardly in container 38.

Figure 8A:
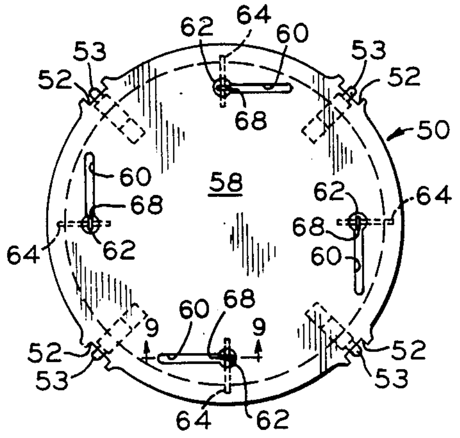
FIG. 8A is a bottom plan view of the bulkhead shown in FIG. 8.
Figure 9:
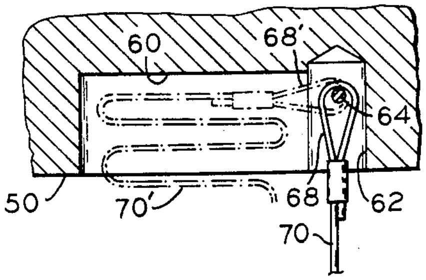
FIG. 9 is an enlarged sectioned partial view of the bulkhead of FIG. 8 showing the cable loop retaining pin assembly and the the cable in the pre-deployed state in dashed lines and in the deployed state in solid lines.

The lower surface 58 of bulkhead 50, FIG. 8A, has four chordal grooves 60 the ends 62 of which are arcuately equidistantly spaced about the periphery of bulkhead 50 and are placed arcuately between notches 52. Cable retaining pins 64 are insertable in and have a friction fit with respective holes which are arcuately equidistantly spaced about bulkhead 50. A cable loop 68, FIG. 9, is formed at the upper end of each of four flexible cables 70 which may be of stranded metal having an insulative covering. The purpose of grooves 60 is to receive a respective collapsed cable in the pre-deployed state of the sonobuoy as shown by the dashed line position of loop 68*a* and cable 70*a* in FIG. 9.

Positioned below bulkhead 50 are three perforated plates: upper plate 72, center plate 74, and lower plate 76, FIGS. 5–7. Each plate has perforations 78 which are dimensioned and spaced as described in the aforementioned parent copending application of John C. Congdon, incorporated herein by reference, and for the purposes described in that application. Each plate has arcuately equidistantly spaced cable receiving holes formed therein about the periphery thereof. Through each cable hole passes a cable 70 and at predetermined points on each cable 70 a crimp bead 82 is crimped on cable 70 above the respective plate and a crimp bead 84 is crimped below the respective plate to position each plate at a predetermined point on each of cables 70.

Figure 7:
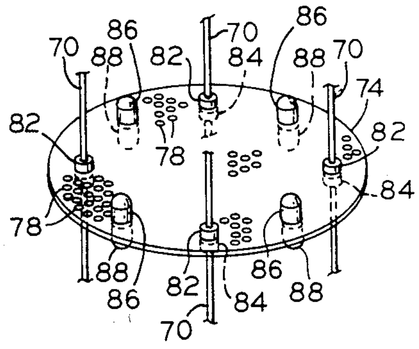
FIG. 7 is a view in perspective of a center baffle plate in one of the three plate phase shift control devices shown in FIG. 6.

Referring to FIG. 7, center plate 74 has four rounded end bumpers 86 affixed to the upper surface and spaced arcuately equidistantly around the periphery thereof and arcuately between the cable holes. Similarly, four rounded end bumpers 88 are affixed to the lower surface of plate 74. The purpose of bumpers 86, 88, which may be of a resilient plastic material, is to provide plates 72, 74, 76 with a predetermined minimum longitudinal spacing therebetween to prevent "squashing" or excessive straining of cables 70 when the sonobuoy is in a pre-deployed state.

Figure 13:
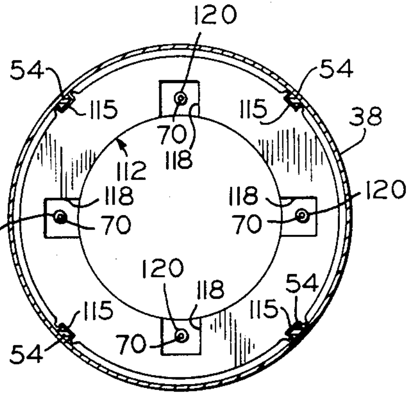
FIG. 13 is a section taken at 13—13 of FIG. 6.
Figure 12:
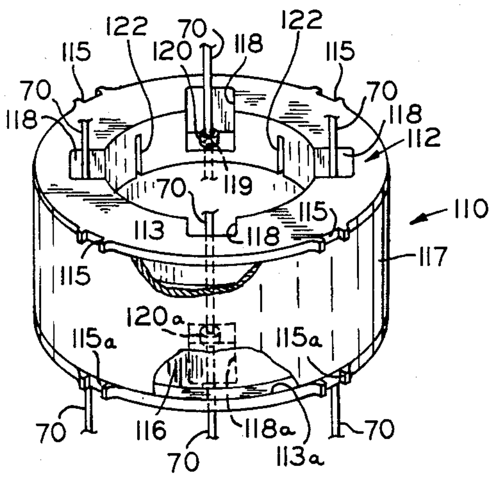
FIG. 12 is a cut away perspective view of the electroacoustic transducer and upper and lower collars assembly.

Referring to FIGS. 6, 12 and 13, longitudinally slidably inserted in container 38 is transducer assembly 110 below plate 76. Assembly 110 has upper collar 112, cylindrical electroacoustic transducer element 117, which may be of materials and construction and operate in the manner of transducer element 20 in the previously referenced copending parent Congdon application, and the lower collar 116 which is identical to upper collar 112 but inserted in container 38 in inverse position from collar 112. Collar 112 is annular in configuration has annular rim 113 and has four substantially square radially inwardly facing recesses 118 which are arcuately equidistantly spaced. Each recess has centered therein an axial hole through which a respective cable 70 passes. The axial end of collar 112 is insertable into a respective end of element 117 with rim 113 providing a shoulder against which the end of element 117 seats. Lower collar 116 is similar in construction and function to upper collar 112 and the reference numerals for corresponding parts in collar 116 are the same but carry the suffix "a". Collars 112 and 116 may be molded of a plastic insulative material such as nylon.

As with plates 72, 74, 76, beads 120, 120*a* are crimped above and below collars 112, 116, respectively, to longitudinally position collars 112 and 116 on cables 70 in the deployed state of sonobuoy 26 and to maintain the axial ends of collars 112, 116 inserted in element 117 and the rims 113, 113*a* of collars 112, 116, respectively, seated against the respective ends of element 117. Rims 113, 113*a* have four equidistantly arcuately spaced radially outwardly facing oblong notches 115, 115*a*, respectively, which slidingly receive respective strips 54.

Four radially inwardly opening slots 122 are formed in collar 112 and are equidistantly arcuately spaced about the periphery of collar 112 to receive the end edges of partitions, not shown, of a cavity baffle as disclosed in the previously referenced Congdon application. Similar slots are formed in collar 116 for similar purposes.

Positioned beneath lower collar 116 is a second set of plates 72*a*, 74*a*, 76*a* similar in construction and function to plates 72, 74, 76 respectively and fastened to cables 70 by crimp beads 82*a*, 84*a* as described for crimp beads 82, 84 respectively.

Figure 14:
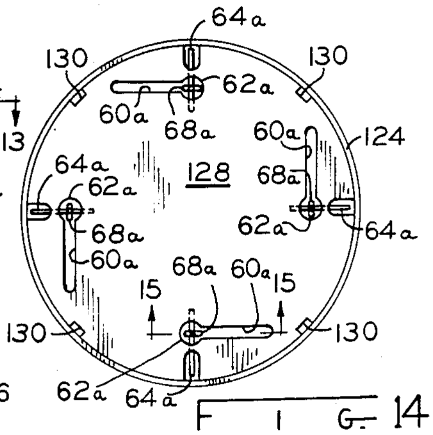
FIG. 14 is a section taken at 14—14 of FIG. 6.
Figure 15:
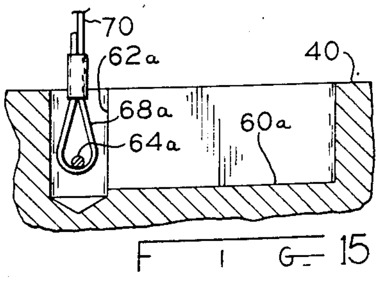
FIG. 15 is an enlarged section taken at 15—15 of FIG. 14.

Nose weight 40 is inserted into the lower end of container 38 and is a solid cylinder of relatively high specific weight metal having a shoulder 124 formed near its upper end against which the lower end of container 38 seats. Fasteners such as screws are placed through corresponding openings in and at arcuately spaced points about the periphery of the lower end of container 38 and threadedly engage weight 40 to secure it to container 38. The upper surface 128, FIG. 14, of nose weight 40 is provided with chordal grooves 60*a* having ends 62*a*. Cable pins 64*a* are inserted in respective holes in nose weight 40 and extend through looped lower ends 68*a* of cables 70 in the manner of and for the purpose of corresponding parts in bulkhead 50. Thus each cable 70 is secured at its upper end to bulkhead 50 and at its lower end to nose weight 40. Nose weight 40 is provided with a plurality of arcuately spaced aligning recesses 130 that align with and have a sliding fit with the chamfered lower ends of respective strips 54 so that nose weight 40 is rotationally aligned with bulkhead 50 and cables 70 are stretched taut parallel with the longitudinal axis of container 38.

Figure 18:
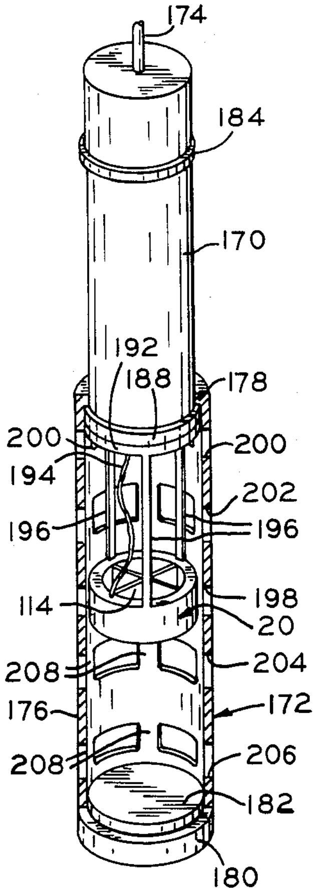
FIG. 18 is a view in perspecive of the embodiment of FIG. 17 shown after deployment.
Figure 19:
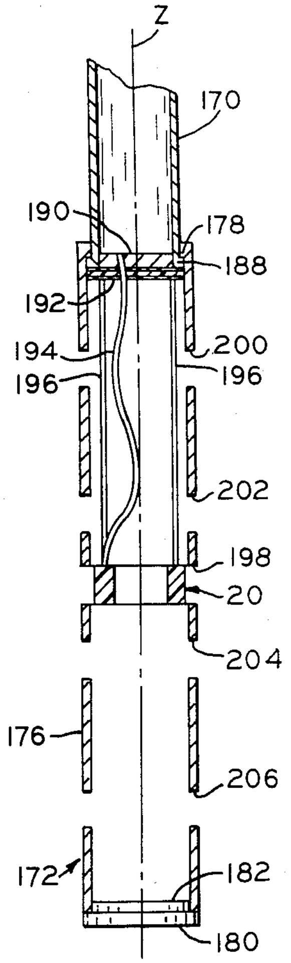
FIG. 19 is a partial and simplified longitudinal cross sectional view of the deployed phased array transducer shown in FIG. 18 showing the relationship of the cylindrical transducer element and the annular ports in the wall of the cylindrical tube.

Container 38 has annular ports 38*a*, 38*b*, 38*c*, 38*d* and 38*e*. In the deployed state, plates 72, 74, 76 are positioned between ports 38*a*, 38*b*; transducer element 117 is positioned at port 38*c*; and plates 72*a*, 74*a*, 76*a* are positioned between ports 38*d* and 38*e*. The proper longitudinal placement of the crimp beads 86, 88, 120, 120*a*, or other position determining members, on cables 70 insure the proper placement of the aforementioned elements relative the ports in the deployed state. The ports are configured in the manner of and perform the function of annular ports 200, 202, 198, 204, 206, FIGS. 18 and 19, described below. Container 38 may be of aluminum or other acoustic wave transmission path boundary material.

Figure 21:
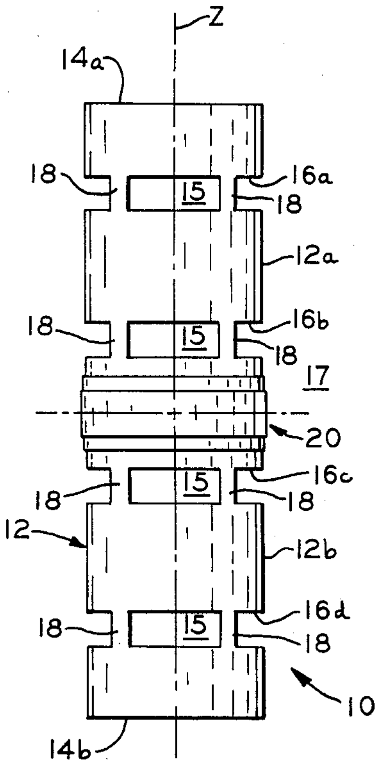
FIG. 21 is a side elevational view of a phased array transducer that may used with this invention.

Referring now to FIG. 21, there is shown a side elevational view of a phased transducer array 10 that may be used in the present invention. The transducer array 10 comprises an elongated cylindrical tube 12 of a suitable material to provide an acoustic tansmission path boundary for acoustic waves traveling interiorly of the tube. Such tube material may be of a metal or a rigid plastic and the tube has suitable longitudinal and diametral dimensions depending on the desired acoustical frequency range and desired beam pattern for which transducer array 10 is designed. It is preferred that tube 12 material have a low acoustic transmissivity, high insensitivity to acoustic vibrations, and low acoustic absorption. Aluminum has been used as a tube material.

Tube 12 has ends 14*a*, 14*b* at the upper and lower ends, respectively, thereof and a plurality of substantially annular apertures or ports 16*a*, 16*b*, 16*c*, 16*d* formed in the wall of tube 12 at predetermined longitudinally spaced apart locations along the length dimension of tube 12. Apertures 16*a*–16*d* each provide an acoustic coupling port between the internal transmission medium 15 internally of tube 12 and the external transmission medium 17 externally of tube 12. Ports 16*a*–16*d* are each formed of four equal arcuate apertures separated by longitudinal struts or ribs 18 which join portions of tube 12 above and below ports 16*a*–16*d* to provide longitudinal structural integrity of tube 12. Ribs 18 are preferably made as thin as possible in the circumferential direction and still maintain the structural rigidity of tube 12. Also, it is preferable that ribs 18 are equally spaced about the circumference of their respective ports to achieve wave pattern symmetry. The width of ribs 18 in the circumferential direction should be enough to provide structural integrity of tube 12 and to offer a means of uncoupling adverse resonances in the tube 12. However, the width should be small compared to the wavelength of the acoustic wave in the medium so that the ribs 18 do not limit the transmission of the acoustical wave through a port aperture and do not interfere with the incoming wave when the transducer array 10 is receiving and forming sine and cosine like directivity patterns in the X-Y plane. For example, a ratio of rib width to wavelength of 1:15 is acceptable. Also a ratio of rib width to one quarter of tube 12 circumference of 1:6 was found to be acceptable. These ratios are a good compromise of acoustic performance and structural integrity of tube 12. Tube 12 comprises an upper elongated portion 12*a* and a lower elongated portion 12*b*. A hollow cylindrical or ring electroacoustical transducer element 20 is supported between portions 12*a*, 12*b*.

Figure 16:
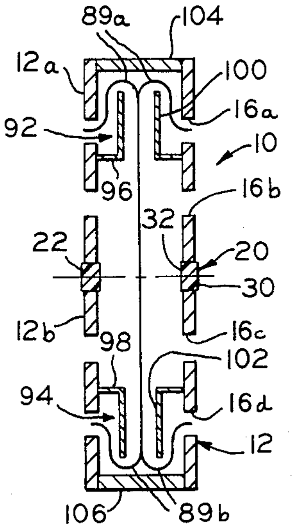
FIG. 16 is a partial and simplified cross sectional view of a phased array transducer and having phase shift controlling waveguide baffles inserted in the transducer container for increasing the internal acoustic transmission path lengths.

As disclosed in the previously referenced copending Congdon application, one manner of obtaining a folded internal acoustic path inside a phased array tube between the inner cylindrical surface of a cylindrical electroacoustic element and selected ports in the tube is to use a folded acoustic wave guide baffle internally of the tube. Referring to FIG. 16, elongated tube 12 is provided with an upper baffle 92, and a lower baffle 94. Baffle 92 is located between ports 16*a*, 16*b* while baffle 94 is located between ports 16*c*, 16*d*. Baffles 92, 94 are of similar construction and have blocking rims 96, 98 respectively affixed to the inner walls of portions 12*a*, 12*b* respectively. Cylindrical elongated tubular chimneys 100, 102 are affixed at their inner ends to rims 96, 98 respectively and are coaxial with tube 12. Chimney 100 extends longitudinally beyond port 16*a* and is directed towards end termination wall 104. Chimney 102 extends beyond port 16*d* and is directed towards end termination wall 106. Thus, direct acoustical communication between surface 32 of element 20 and ports 16*a*, 16*d* or between port pairs 16*a*, 16*b* and 16*c*, 16*d* is blocked by baffles 92, 94 respectively. However acoustical wave communication therebetween is provided by the resulting folded acoustic paths 89*a*, 89*b*. In addition acoustic wave reflection from end walls 104, 106 respectively can also be provided to attain desired phase at the ports 16*a*, 16*d*. Thus the effective wave path length is increased without an increase of the actual physical spacing between the ports and wave phase at ports 16*a*, 16*d* may be adjusted by corresponding placement of ends 104, 106 in tube portions 12*a*, 12*b* respectively and by the actual length of the folded paths 89*a*, 89*b*. Folded path length is of course a function of the longitudinal axial dimension of chimneys 100, 102. Use of baffles 92, 94 provides for a shorter overall tube 12 length and closer physical spacing between the ports 16*a*–16*d* to achieve the desired end or side lobe suppression and vertical directivity. Baffles 92, 94 are not limited to use between the ports shown but may be used between any desired ports to provide the proper acoustic wave phase shift between the ports and/or between any of the ports and surface 32 of the transducer element 20.

Figure 22:
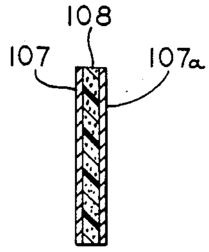
FIG. 22 is an enlarged cross sectional partial view of a baffle of FIG. 16.

Preferably, baffles 92, 94 are symmetrically longitudinally spaced from element 20, although non-symmetrical spacing may be used to achieve particular phase conditions at particular ports. Baffles 92, 94 are preferably acoustically non-transmissive and may be constructed of a sandwich of two rigid layers such as layers 107, 107*a*, FIG. 22, about an intermediate pressure release layer 108 of an air entrapped material or mesh. For baffles 92, 94 layers 107, 107*a* may be of brass shim stock and layer 108 may be of a foam plastic. Further, chimneys 100, 102 may be collapsible bellows or telescopic in construction to accommodate a pre-deployment condition of the transducer array 10.

Phase and amplitude may also be adjusted by adjusting the acoustical surface impedance of reflecting surfaces of end walls 104, 106. Referring to FIG. 16, end walls 104, 106 act as reflection surfaces for acoustical wave travel between surface 32 and ports 16*a*, 16*d* respectively. The acoustical properties of end walls 104, 106 affect wave transmission through the end walls 104, 106 and the internal standing wave by the acoustical impedance presented to the cylindrical tube 12 wave which determines the amount of wave reflection and wave absorption or attenuation. The material for end walls 104, 106 is chosen to obtain the desired impedances. Also, end walls 104, 106 while shown longitudinally symmetrically placed from surface 32 may be nonsymmetrically positioned for desired acoustical patterning. It is noted that while tube 12 is shown with end walls 104, 106, a tube with open ends is also usable with the teaching of this invention.

Referring to FIGS. 17–20A, an embodiment is shown in both pre-deployed and deployed states. Transducer array 172 corresponds to array 10 in the embodiment of FIGS. 1–6 and in the FIG. 17 cross section the ports are not shown. Transducer tube 176 is telescoped over electronics canister 170 in a pre-deployed state, FIG. 17, prior to use to conserve space and provide transducer protection in packaging, shipment, and storage and then the transducer is extended to the deployed state, FIGS. 18, 19, when in use.

Elongated cylindrical canister 170 houses the electronics package which is coupled to electrical leads from element 20 and not shown in FIGS. 17–20A via cable 194 to receive electrical signals from and/or transmit electrical signals to element 20 depending on whether transducer array 172 is in a receiving or transmitting mode, respectively. Signal cable 174 extends from the upper end of canister 170 to transmit and/or receive electrical signals to a surface floated electronic canister, not shown, which normally contains an radio frequency transmitter or transceiver and associated antenna. Cable 174 can also comprise a suspension cable for suspending the deployed transducer array 172 in the water. Element 20 has a cavity baffle 114 inserted therein in a manner and for purposes as described in the previously referenced Congdon application.

Electronics canister 170 has annular guide flanges 184, 188 extending outwardly from the canister 170 spaced from the upper and at the lower ends of the canister respectively. Annular flange 188 is slidable along the inner wall of tube 176 during transition between the pre-deployed and deployed states. Tube 176 has an inner annular flange 178 at its upper end and is slidable along the outer wall of canister 170 during transition between the pre-deployed and deployed states. The coaction of flange 178 with flanges 184, 188 limit relative longitudinal travel of canister 170 within tube 176. In the pre-deployed state, flange 184 seats against flange 178 and limits further travel of canister 170 into tube 176 and provides space between the bottom of tube 176 and bottom end of canister 170 for storage of transducer 20, signal cable 194, and transducer element 20 suspension cables 196. In the deployed state flange 188 seats against flange 178 and limits any further withdrawal of canister 170 from tube 176. Cylindrical tube 176 has an end termination wall 180 at its lower end. Acoustic wave impedance disk 182 is affixed to and coextensive with inner side of wall 180. Lower end 190 of canister 170 is provided on its lower surface with an acoustic wave impedance disk 192. In the deployed state, the impedance of the combination of end 180 and disk 182 and the combination of end 190 and disk 192 function similar to ends 106 and 104 respectively as previously described and shown in FIG. 16. Disks 182, 192 provide impedance terminations of the ported tube 176 of the transducer array 172.

Electrode leads from element 20 are connected to canister 170 in flexible cable 194. Element 20 is suspended from canister 170 end wall 190 by a plurality of flexible cords 196, the lower ends of which are molded in encapsulating material 24, FIGS. 20, 20A, or otherwise attached to element 20. The upper ends of cords 196 are secured to wall 190 by suitable means. Cable 194 and cords 196 are collapsed in the pre-deployed state. Cords 196 are extended to their full length in the deployed state, and are of a length to position element 20 opposite annular port 198 formed in tube 176. Longitudinally spaced annular ports 200, 202, 204, 206, which correspond to ports **16*a*, 16*b*, 16*c*, 16*d*, respectively, are formed in tube 176, each port having longitudinal supporting ribs 208, which correspond to ribs 18, FIG. 21**, formed therein. Corresponding parts are similar in construction and function. It should be understood that the transducer array of the present invention need not be attached to or suspended from an electronics canister such as is shown herein but may if desired be otherwise suspended from available and appropriate types of surface or sub-surface members.

Figure 20:
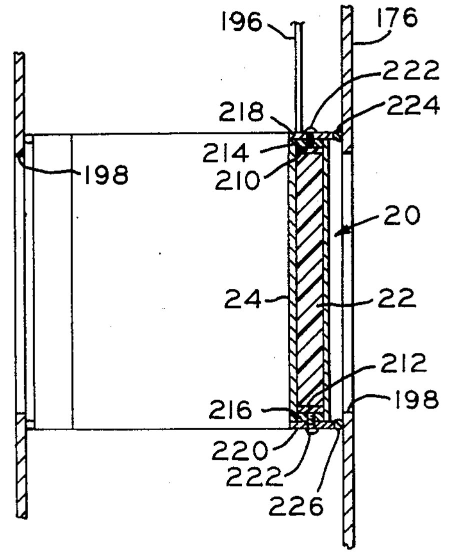
FIG. 20 is an enlarged partially sectioned partial view of the electroacoustic transducer element portion of the embodiment disclosed in FIGS. 17-19.
Figure 20A:
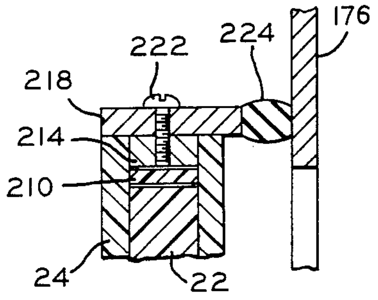
FIG. 20A is a further enlarged sectioned partial view of the element and tube of the embodiment of FIGS. 17-20 in the deployed state.

Referring to FIGS. 20, 20A, annular end shields 210, 212 are of a pressure release material such as an air entrapped material or mesh and are placed over and under the upper and lower ends respectively of ring 22, and function to reduce acoustic radiation from the ends of ring 22 into tube 176.

Flat support annuli 214, 216 are placed above and below, respectively, shields 210, 212 and retaining annuli 218, 220 are secured as by bolts 222 to support annuli 214, 216 respectively. Annuli 218 and 214, as well as annuli 220, 216, may be a unitary machined annulus. The outer perimeters of retaining annuli 218, 220 extend radially beyond the outer wall of material 24 and abut resilient, acoustic isolator rings 224, 226, respectively. Rings 224, 226 are affixed as by cementing such as with epoxy to the annuli 218, 220, respectively, and may be of Corprene TM material, rubber, or other resilient material and act as acoustic seals to prevent an acoustic leakage path between the outer surface of element 20 and the interior of tube 176. Rings 224, 226 may also comprise suitable "O" rings fitted in annular grooves (not shown) in the retaining annuli 218, 220.

Figure 17:
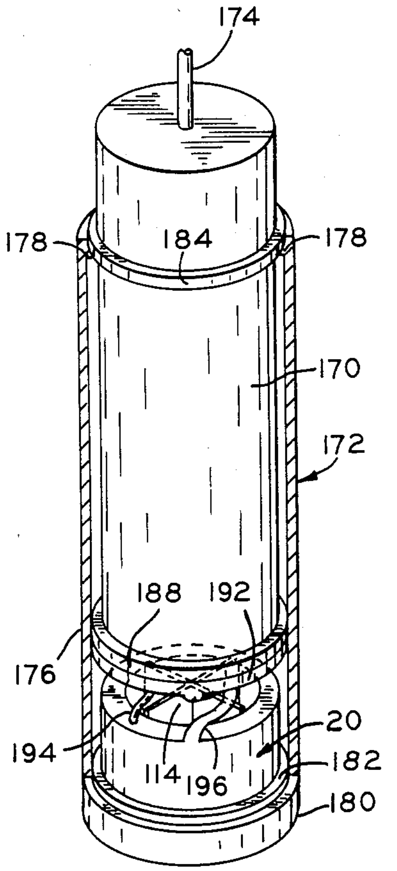
FIG. 17 is a view in perspective of the phased array transducer suitable for use in a sonobuoy and showing the transducer prior to its deployment.

In the operation of the embodiment of FIGS. 17–20, transducer array 172 is deployed from the pre-deployment state of FIG. 17 by the sliding of tube 176 downwardly on canister 170 until flanges 178, 188 seat. Element 20 slides within tube 176 until cords 196 are taut, at which time element 20 is opposite port 198. Baffles 92, 94 may be positioned in tube 176 above and below element 20, respectively and are preferably of the kind that have collapsible or telescopic chimneys 100, 102 so that in the pre-deployed state the profile of canister 170 and transducer 172 has a minimum longitudinal dimension and upon deployment, the chimneys 100, 102 extend to their full longitudinal dimension. The deployment may be manually or automatically accomplished as is known in the art. Baffles 92, 94 are preferably suspended by flexible cords similar to cords 196 and be of a length to position baffles 92, 94 in their proper relation to ports 200–206 to obtain the desired length of wave travel in tube 176. Suitable baffle plates such as plates 304, 306, 308 as hereinafter described in relation to FIGS. 23–25 may also be used in lieu of chimney baffles 92, 94 and can likewise be suspended by flexible cords similar to cords 196 of suitable lengths to position the plates in proper locational relationship to the ports 200–206 to provide proper internal phase shift.

Figure 23A:
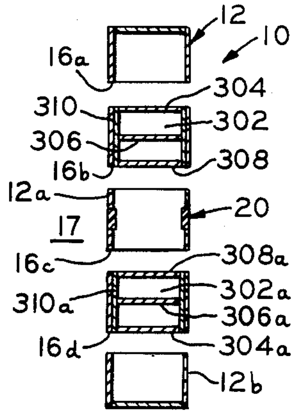
FIG. 23A is simplified longitudinal cross section of a transducer array having two phase shift controls of the kind shown in FIG. 23 mounted in an array tube.
Figure 23:
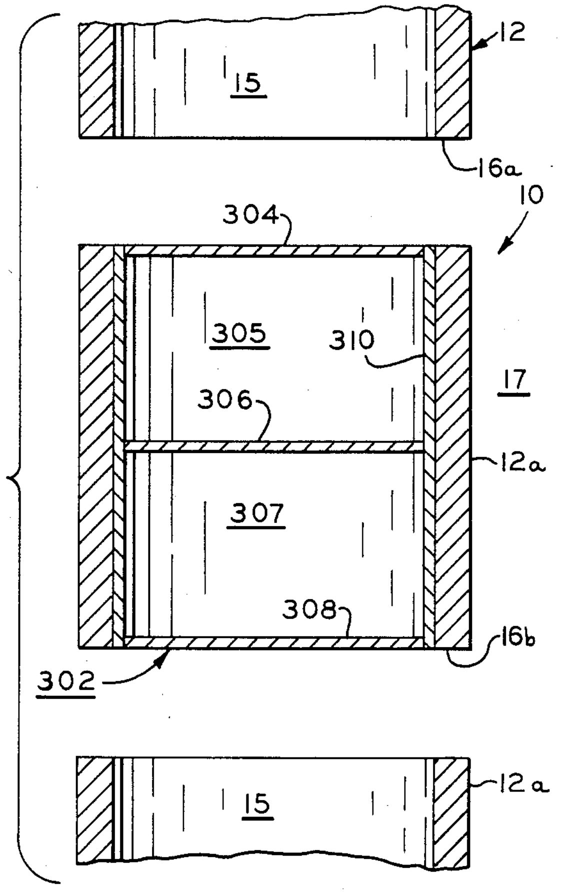
FIG. 23 is a partial enlarged, simplified, longitudinal cross section of an array of this invention having another embodiment of a phase shift control internally of the array tube comprising a plurality of circular perforated plates.
Figure 24:
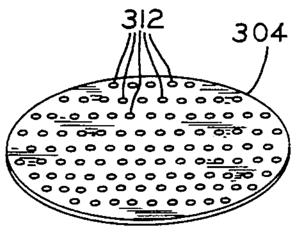
FIG. 24 is a view in perspective of a single perforated plate of the FIG. 23 embodiment.
Figure 25:
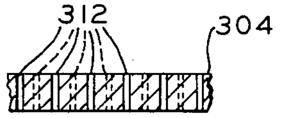
FIG. 25 is an enlarged cross section of a portion of the plate in FIG. 24.

Referring to FIGS. 23–25 another internal phase shift control member 302 is shown and described in connection with array 10 shown in FIG. 21. Mounted in tube section **12*a* of array 10, shown in partial section in FIG. 23, member 302 comprises three circular perforated longitudinally spaced baffles or plates 304, 306, 308 shown positioned between ports 16*a*, 16*b*. Plates 304, 306, 308 are similar in construction to one another and are fixedly spaced longitudinally in tubular cylinder 310 the outer surface of which is affixed as by cementing to the inner wall of section 12*a*. Plates 304, 306, 308 are each longitudinally spaced from the next adjacent plate by a nominal length of approximately one eighth wavelength of a nominal frequency in the frequency band for which array 10 is designed, the longitudinal spacing of the plates depending upon the longitudinal spacing between ports 16*a*, 16*b* and/or between ports 16*c* and 16*d*. Plates 304, 306, 308 are cemented as with epoxy cement or otherwise firmly affixed at their peripheries to the inner wall of cylinder 310. Alternatively, plates 304, 306, 308 could be firmly affixed at their respective peripheral edges to the inner wall surface of tube section 12*a* as with epoxy cement. It is important that mounting of plates 304, 306, 308 be such as to minimize plate vibration. Other manners of affixing plates 304, 306, 308 in place may be utilized. It is understood a phase shift control member similar to member 302 is mounted in similar manner between ports 16*c*, 16*d* of tube section 12*b* as shown in FIG. 23A. In one embodiment of the phase control member 302, the baffle plates 304, 306 and 308** were made from perforated aluminum having a hole size of 0.062 inches and an open to closed ratio of approximately 40% at a nominal operating frequency of nine (9) kHz of the transducer array.

Referring to FIG. 23A, an embodiment is shown wherein an array 10 has a phase shift control member 302 mounted between ports **16*a*, 16*b*, and phase shift control member 302***a* mounted between ports 16*c*, 16*d*. Member 302*a* has plates 304*a*, 306*a*, 308*a* mounted in cylinder 310*a* and are similar in construction and operation to member 302, plates 304, 306, 308, and cylinder 310, respectively.

Referring to FIGS. 24, 25 plate 304 will be described. The longitudinal spacing of the plates may vary depending on the hole 312 diameter, the number of plates, the number of holes on each of plates 304, 306, 308, the hole total area on each plate, but the longitudinal plate spacing is preferably not greater than one eighth wavelength of the aforementioned nominal frequency.

Member 302 functions to maintain a minimal or substantially reduced phase shift of an acoustical wave between its longitudinal ends. A lesser or greater number of plates 304, 306, 308 may be used in member 302.

Phase shift control member 302 controls the phase between ports 16*a*, 16*b* of transducer tube 12. In particular, member 302 produces a low or minimum phase shift in the acoustic wave as the wave propagates along the axis of tube 12. The phase is thus controlled locally, as by member 302, along the length of the acoustically distributed - parameter tube 12, which can be considered to be an acoustical transmission line. Without a phase control member for local phase shift control, the acoustical wave would be controlled by the distributed nature of the tube and a phase shift would occur along a short length of the tube. The phase is controlled as by member 302 along the length of the tube between pertinent adjacent ports to satisfy the relative phase required of the waves which radiate from these adjacent ports. The relative phase is determined from requirements to obtain the desired vertical directivity pattern.

In member 302, spaced plates 304, 306, 308 each have holes 312 and are used to form a low pass acoustic filter having a cut off frequency. When the frequency of the internal wave in the transducer tube 12 is substantially below the cutoff frequency of the low pass filter, only a small or minimum phase shift of the acoustical wave which passes through member 302 occurs and the wave is attenuated only a small or minimum amount. As will be understood by those in the art, a zero degree (0°) phase shift is equivalent to a 360° phase shift. To the extent that member 302 does not shift the phase of the acoustical wave a full 360° an additional phase shift may be added to the wave to attain the 360° shift with other means such as additional transmission path length.

Each plate 304, 306, 308 of filter 302 is mounted transversely to the axis of the transducer tube 12. The holes 312 in each plate 304, 306, 308 become acoustical masses which are in parallel with each other in an equivalent circuit configuration. Chamber 305 created between adjacent plates 304, 306, and chamber 307 created between adjacent plates 306, 308 each forms an acoustical compliance or stiffness.

The overall acoustical mass created by the holes 312 in each plate 304, 306, 308 acts in series with the acoustical wave traveling along the axis of the tube 12. The compliant chambers 305, 307 between adjacent plates each forms a compliant reactance to "acoustical ground". The final plate in the direction of wave propagation is terminated by the acoustical impedance of the remaining length of the tube 12. An equivalent acoustical circuit is a ladder network that has the acoustical masses and compliant chambers as circuit elements which define a cutoff frequency for the low pass filter structure.

The filter may be designed so that the cutoff frequency is sufficiently above the operating acoustical wave frequency of the transducer 10. The low phase shift across filter 302 results because of this property of the low pass filter below cutoff and because the acoustical energies in the masses and compliances act like lumped circuit elements. Thus the energy in the acoustical wave is passed along the structure with low phase shift.

The spacing between adjacent plates 304, 306, 308 and therefore the dimensions of the compliant cavities 305, 307 is designed to be substantially less than a wavelength of a nominal operating frequency of sound in the internal transmission medium 15 in tube 12, and is typically an eighth-wavelength or less, so that each compliant chamber 305, 307 can be considered to be a lumped element. Also, the holes 312 in the perforated metal plates 304, 306, 308 are designed to have the correct acoustical mass to provide the desired cutoff frequency, yet not be too small to have an appreciable acoustical resistance. In other words, the mass reactance of the holes 312 should predominate over the resistive component of the impedance of the plates 304, 306, 308.

The number of plates 304, 306, 308 required depends upon the length of the tube 12 over which a minimal amount of phase shift is desired for the internal acoustical wave. For example, a longer section of tube 12 in which phase shift control is desired, requires more plates 304, 306, 308 to satisfy the eighth-wavelength, or less, criterion to preserve the lumped element consideration for the compliant chambers 305, 307. As the number of plates changes, the size of the holes 312 in each plate changes to maintain the same cutoff frequency relative to the operating frequency of the transducer 10.

Low pass filter 302 is a useful structure for the tube 12 (acoustical transmission line) to control phase of the internal wave at a particular location along an otherwise distributed parameter acoustical "transmission line" tube 12.

The filter structure 302 also provides some isolation between sections of the tube 12 to avoid any adverse internal interactions of adjacent ports in ports 16*a*–16*d*. The filter 302 is easily packaged by collapsing its structure and is easily deployed in an inverse mechanical manner. For a discussion of filter theory cf. "Electromechanical Transducers and Wave Filters" by Warren P. Mason, Second Edition, D. Van Nostrand Co. Inc., Princeton N.J.

Figure 26:
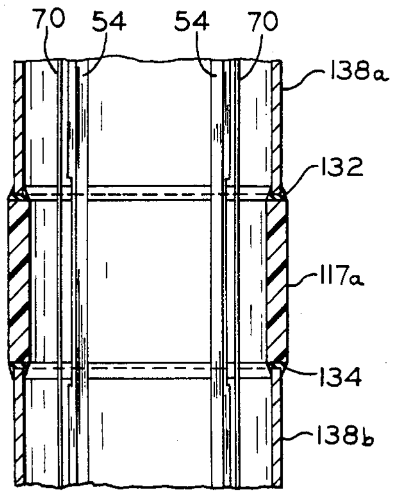
FIG. 26 is a partial, sectional view of a modified sonobuoy of FIG. 6 wherein the transducer element is mounted in the container.

In the embodiment of FIG. 26, the FIG. 6 embodiment is modified as described below. FIG. 6 container 38 is replaced by elongated tubular upper section 138*a* and lower section 138*b*, each section having a longitudinal axis. Transducer assembly 110 is replaced by electroacoustic transducer element 117*a*, which is ring shaped and may be of a material and construction and operate in the manner of transducer element 20 in the previously referenced copending parent Congdon application. Element 117*a* is coaxial with sections 138*a*, 138*b* and is circumferentially and diametrically substantially coextensive with sections 138*a*, 138*b*. Element 117*a* is bonded at its axial upper peripheral edge to the axial lower peripheral edge of section 138*a* with an elastomeric material 132, such as a polyvinyl elastomeric, that provides a secure attachment and yet allows the piezoelectric material of element 117*a* to vibrate substantially unrestricted by section 138*a*. In similar manner, the axial lower peripheral edge of element 117*a* is bonded to the axial upper peripheral edge of lower section **138*b* by elastomeric material 134. Element 117*a* may also be coupled to sections 138*a*, 138*b* as disclosed and described for the FIG. 4 embodiment of the aforementioned Congdon application. Thus, element 117*a* is essentially placed in port 38*c* of the FIG. 6** embodiment.

The remaining components of the embodiment of FIG. 26 are similar to and carry similar reference numerals to those of the embodiment of FIG. 6. Sections **138*a*, 138*b* are constructed similarly to container 38 of FIG. 6** except as described above.

The operation of the embodiment of FIG. 26 is similar to that of embodiment of FIG. 6 except that since element **117*a* is affixed to sections 138*a*, 138*b* it does not axially slide or move relative sections 138*a*, 138*b* during deployment of the sonobuoy. Plates 72, 74, 76 and plates 72*a*, 74*a*, 76*a* are deployed in the FIG. 26 embodiment as they are in the FIG. 6** embodiment.

Figure 27:
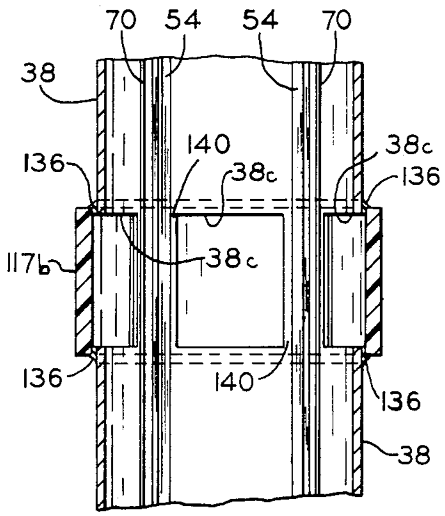
FIG. 27 is a partial, sectional view of a modified sonobuoy of FIG. 6 wherein the transducer element is mounted outside the container.

In the embodiment of FIG. 27, the FIG. 6 embodiment is modified as described below. Transducer assembly 110 is replaced by electroacoustic transducer element **117*b*, which is similar to element 117*a* of the FIG. 26 embodiment, except that the circumference and diameter of element 117*b* are greater than those of container 38 which extends therethrough and is coaxial therewith. Element 117*b* is affixed at an axial location of container 38 that is opposite port 38*c* by bonding with an elastomeric material 136, such as a polyvinyl elastomeric, to the outer surface of ribs 140 that are arcuately spaced about port 38*c* and are similar in dimension, construction and function to ribs 18, FIG. 21. In the example shown, where element 117*b* is longer in the axial direction than port 38*c*, the outer surface of container 38 above and below port 38*c* it is also bonded to element 117*b* above and below port 38*c*. Material 136 provides a secure attachment to container 38 and yet allows the piezoelectric material of element 117*b* to vibrate substantially unrestricted by container 38. Element 117*b* may also be equal in length or shorter in length in the axial direction than port 38*c* and the bonding to ribs 140** will provide adequate transducer element support.

The remaining components of the embodiment of FIG. 27 are similar to and carry similar reference numerals to those of the embodiment of FIG. 6. The operation of the embodiment of FIG. 27 is similar to that of embodiment of FIG. 6 except that element **117*b* replaces assembly 110. Since element 117*b* is affixed to container 38, it does not axially slide or move relative container 38 during deployment of the sonobuoy. Plates 72, 74, 76 and plates 72*a*, 74*a*, 76*a* are deployed in the FIG. 27 embodiment as they are in the FIG. 6** embodiment.

In the embodiments of FIGS. 26, 27 in the pre-deployed condition, plates **72, 74, 76, 72*a*, 74*a*, 76*a* are stacked in descending order, one on top of the other, near the bottom of section 138*b*, FIG. 26, or container 38, FIG. 27. Preferably, spacing bumpers 86 are affixed to the upper surface of plate 72*a* to provide axial spacing between plates 76 and 72*a*** in the pre-deployed condition.

Modifications in addition to those already mentioned that can be employed with the teaching of this invention include a container 38 having a flat side and the internal elements such as bulkhead 50, plates **72, 74, 76, 72*a*, 74*a*, 76*a*, transducer assembly 110 and nose weight 40 each having a corresponding flat side that slidingly engage the container 38 flat side to maintain a predetermined relative rotational position between the elements. Other telescopic supporting structures may be used in lieu of cables 70. The internal elements may be in separate respective cylindrical sleeves which are of varying lengths and telescopic one within another and have appropriate stop members so that in a pre-deployed state the sleeves are all one within another and in a deployed state they are fully extended one from the other. Also, tensile springs may be used in place of flexible cables 70. Telescopic rods may be used instead of cables 70. The baffle set of plates 72, 74, 76 and the baffle set of plates 72*a*, 74*a*, and 76*a* may be replaced with other phase control members and/or active electroacoustic transducers. Spacers between the baffle plates may be other than bumpers 86, 88. Each set of crimp beads 82, 84 may be replaced with other plate positioning members such as with a single crimp bead that is affixed to a respective plate. Containers 38 can be open ended at the lower end, and diametral rods may be used to support the lower ends of cables 70. Lower canister 36 and container 38** can be inverted in position.

While there have been described above the principles of this invention in connection with specific embodiments, it is to be understood that this is by way of example and is not limiting of the scope of this invention.

What is claimed is:

1. Extendible sonobuoy apparatus for immersion in an external acoustic transmission medium comprising:

a substantially rigid tubular outer member having an end to end axis and axial first and second ends; said outer member having an interior passage;

a substantially rigid cylindrical inner member having first and second ends and an end to end axis substantially coaxial with said outer member axis; said inner member being telescopically movable into said outer member interior passage to an inserted first position relative said outer member and being telescopically extendible from said first end of said outer member to an extended second position relative said outer member;

an electroacoustic transducer for converting between electrical signals and acoustical waves; said transducer having first and second axial ends;

first means coupled between said inner member and said transducer for providing a predetermined axial movement of said transducer in said outer member upon a predetermined portion of the axially extending movement of said inner member relative said outer member from said first position to said second position and for supporting said transducer at a predetermined axial first location intermediate the ends of said outer member when said inner member is in said second position relative said outer member;

acoustic coupling means for providing one or more acoustic coupling openings in said outer member at said predetermined axial first location, whereby said transducer is positioned at said openings when said inner member is in said second position relative said outer member to provide acoustical interaction between said transducer and said outer member interior passage and to provide acoustical coupling between said transducer and the transmission medium external said outer member.

2. The apparatus of claim 1 wherein said acoustic coupling means provides one or more openings at a plurality of axially spaced peripheries on said outer member.

3. The apparatus of claim 2 wherein said acoustic coupling means comprises one or more openings in a substantially arcuate configuration at a second periphery of said outer member at an axial second location spaced in one axial direction from said axial first location.

4. The apparatus of claim 3 wherein said acoustic coupling means comprises one or more openings in a substantially arcuate configuration at a third periphery of said outer member at an axial third location spaced from said axial first location in the axial direction opposite to said one axial direction.

5. The apparatus of claim 3 including a first phase control means for controlling the acoustical wave phase in said outer member; said first phase control means being positioned in said outer member closely adjacent said first axial end of said transducer when said inner member is in said first position; said first phase control means being axially slidable in said outer member;

said first means coupled between said inner member and said first phase control means for providing a predetermined axial movement of said first phase control means in said outer member upon said predetermined portion of the axially extending movement of said inner member relative said outer member from said first position to said second position and for supporting said first phase control means at a predetermined axial location on said outer member between said axial first and second locations when said inner member is in said second position relative said outer member.

6. The apparatus of claim 4 including a first and second phase control means for controlling the acoustical wave phase in said outer member; said transducer being axially between and closely adjacent said first and second phase control means when said inner member is in said first position; said first and second phase control means being axially slidable in said outer member;

said first means being coupled between said inner member and each of said first and second phase control means for providing a predetermined axial movement of said first and second phase control means in said outer member upon said predetermined portion of the axially extending movement of said inner member relative said outer member from said first position to said second position and for supporting said first phase control means at a predetermined axial fourth location on said outer member between said axial first and second locations when said inner member is in said second position relative said outer member and for supporting said second phase control means at a predetermined axial fifth location on said outer member between said axial first and third locations when said inner member is in said second position relative said outer member.

7. The apparatus of claim 1 including an element being positioned in said outer member adjacent said first axial end of said transducer when said inner member is in said first position; said element being axially slidable in said outer member;

said first means coupled between said inner member and said element for providing a predetermined axial movement of said element in said outer member upon said predetermined portion of the axially extending movement of said inner member relative said outer member from said first position to said second position and for supporting said element at a predetermined axial location on said outer member when said inner member is in said second position relative said outer member.

8. The apparatus of claim 7 including a plurality of said elements being positioned in said outer member; each of said elements being adjacent said transducer when said inner member is in said first position; each of said elements being axially slidable in said outer member;

said first means coupled between said inner member and each of said elements for providing a respective predetermined axial movement for each of said elements in said outer member upon said axillly extending movement of said inner member relative said outer member from said first position to said second position and for supporting each of said elements at respective predetermined axial locations, corresponding to said respective movements, on said outer member when said inner member is in said second position relative said outer member.

9. The apparatus of claim 1 wherein said first means comprises a plurality of flexible cables; each of said cables being connected at one end to said inner member and connected at the opposite end to said second end of said outer member;

attaching means for attaching said transducer at an intermediate point of each of said cables; said cables being dimensioned to become taut and said intermediate point being selected to support said transducer at said predetermined axial first location when said inner member is in said second position.

10. The apparatus of claim 6 wherein said first means comprises a plurality of flexible cables; each of said cables being connected at one end to said inner member and connected at the opposite end to said second end of said outer member;

attaching means for attaching at respective intermediate points at each of said cables said transducer and said first and second phase control means; said cables being dimensioned to become taut and said attachment intermediate points being selected to support said transducer at said predetermined axial first location, said first phase control means at said axial fourth location and said second phase control means at said axial fifth location when said inner member is in said second position.

11. The apparatus of claim 1 wherein said inner member is an electronics canister.

12. Extendible sonobuoy apparatus for immersion in an external acoustic transmission medium comprising:

a substantially rigid tubular outer member having an end to end axis and axial first and second ends; said outer member having an interior passage;

a substantially rigid cylindrical inner member having first and second ends and an end to end axis substantially coaxial with said outer member axis; said inner member being telescopically movable into said outer member interior passage to an inserted first position relative said outer member and being telescopically extendible from said first end of said outer member to an extended second position relative said outer member;

an electroacoustic transducer for converting between electrical signals and acoustical waves; said transducer having first and second axial ends;

said transducer comprising a ring having inner and outer surfaces and being substantially coaxial with said outer member; said ring having first and second axial ends having first and second peripheral edges, respectively;

attaching means for attaching said ring first and second ends to said outer member to fixedly support said ring at a predetermined axial first location intermediate the ends of said outer member and for providing substantially unrestricted vibration of said ring relative said outer member; whereby said transducer is positioned at said predetermined axial first location to provide acoustical interaction between said transducer and said interior passage of said outer member and to provide for acoustical coupling between said transducer and the transmission medium external said outer member.

13. The apparatus of claim 12 wherein said outer member has first and second axially aligned sections; said first and second peripheral edges being substantially coextensive with said first and second sections, respectively, so that said ring is between and axially separates said first and second sections.

14. The apparatus of claim 12 wherein said the periphery of said ring is larger than the periphery of said outer member so that said outer member extends through said ring;

acoustic coupling means comprising at least one opening being formed in said outer member at said predetermined axial first location for providing acoustical wave communication between said transducer and the interior of said outer member.

15. The apparatus of claim 12 including acoustic coupling means comprising one or more openings in a substantially arcuate configuration at a second periphery of said outer member at an axial second location spaced in one axial direction from said axial first location.

16. The apparatus of claim 15 wherein said acoustic coupling means comprises one or more openings in a substantially arcuate configuration at a third periphery of said outer member at an axial third location spaced from said axial first location in the axial direction opposite to said one axial direction.

17. The apparatus of claim 15 including a first phase control means for controlling the acoustical wave phase in said outer member; said first phase control means being positioned in said outer member closely adjacent said axial second end of said outer member when said inner member is in said first position; said first phase control means being axially slidable in said outer member;

first means coupled between said inner member and said first phase control means for providing a predetermined axial movement of said first phase control means in said outer member upon said predetermined portion of the axially extending movement of said inner member relative said outer member from said first position to said second position and for supporting said first phase control means at a predetermined axial location on said outer member between said axial first and second locations when said inner member is in said second position relative said outer member.

18. The apparatus of claim 16 including a first and second phase control means for controlling the acoustical wave phase in said outer member; said first and second phase control means being positioned in said outer member closely adjacent said axial second end of said outer member when said inner member is in said first position; said first and second phase control means being axially slidable in said outer member;

first means being coupled between said inner member and each of said first and second phase control means for providing a predetermined axial movement of said first and second phase control means in said outer member upon said predetermined portion of the axially extending movement of said inner member relative said outer member from said first position to said second position and for supporting said first phase control means at a predetermined axial fourth location on said outer member between said axial first and second locations when said inner member is in said second position relative said outer member and for supporting said second phase control means at a predetermined axial fifth location on said outer member between said axial first and third locations when said inner member is in said second position relative said outer member.

* * * * *